July 18, 1933.  C. J. HOLLAND  1,918,646
FRICTION DRAFT GEAR
Filed Sept. 30, 1927  2 Sheets-Sheet 2
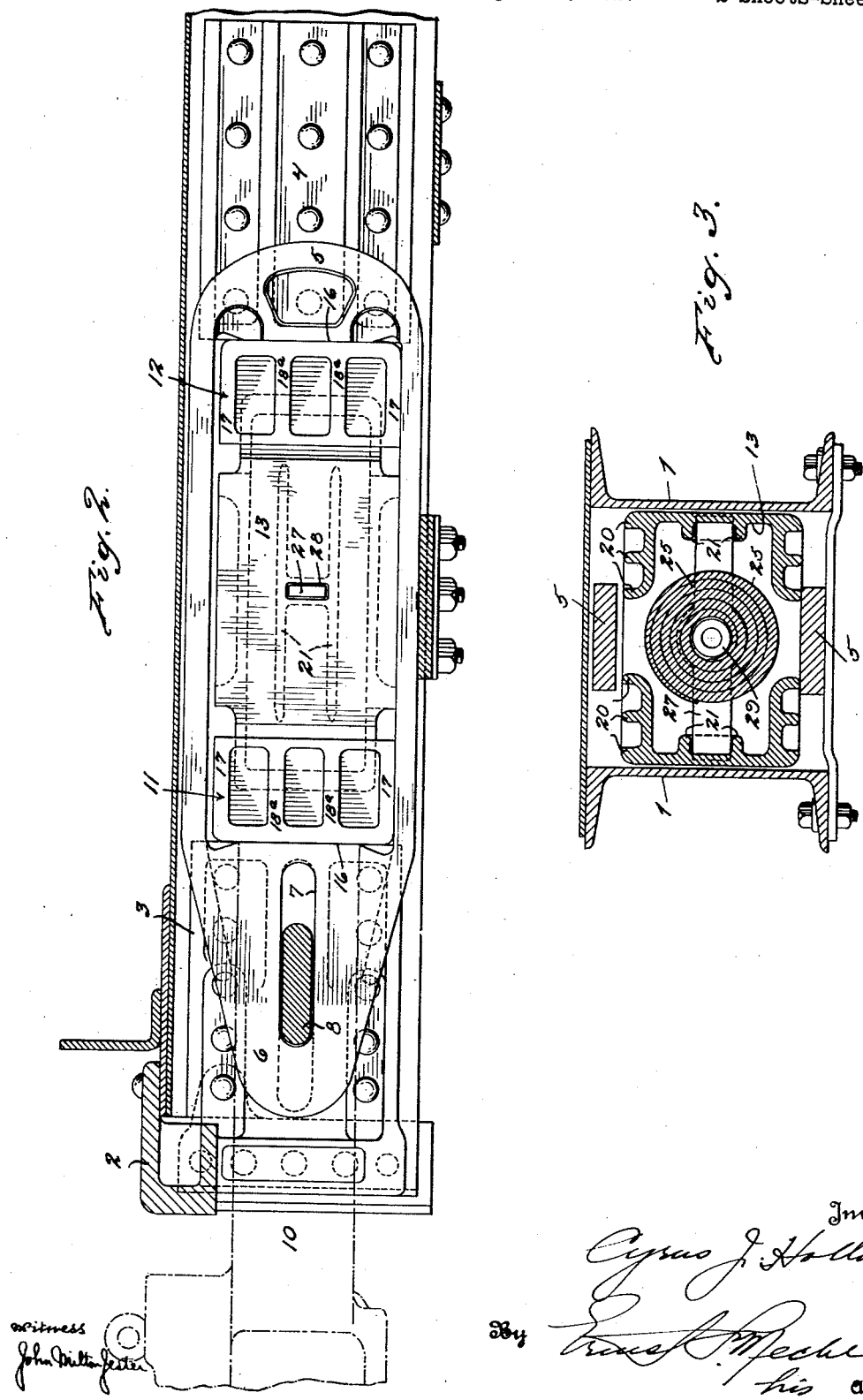
Inventor
Cyrus J. Holland
By his Attorney Patented July 18, 1933

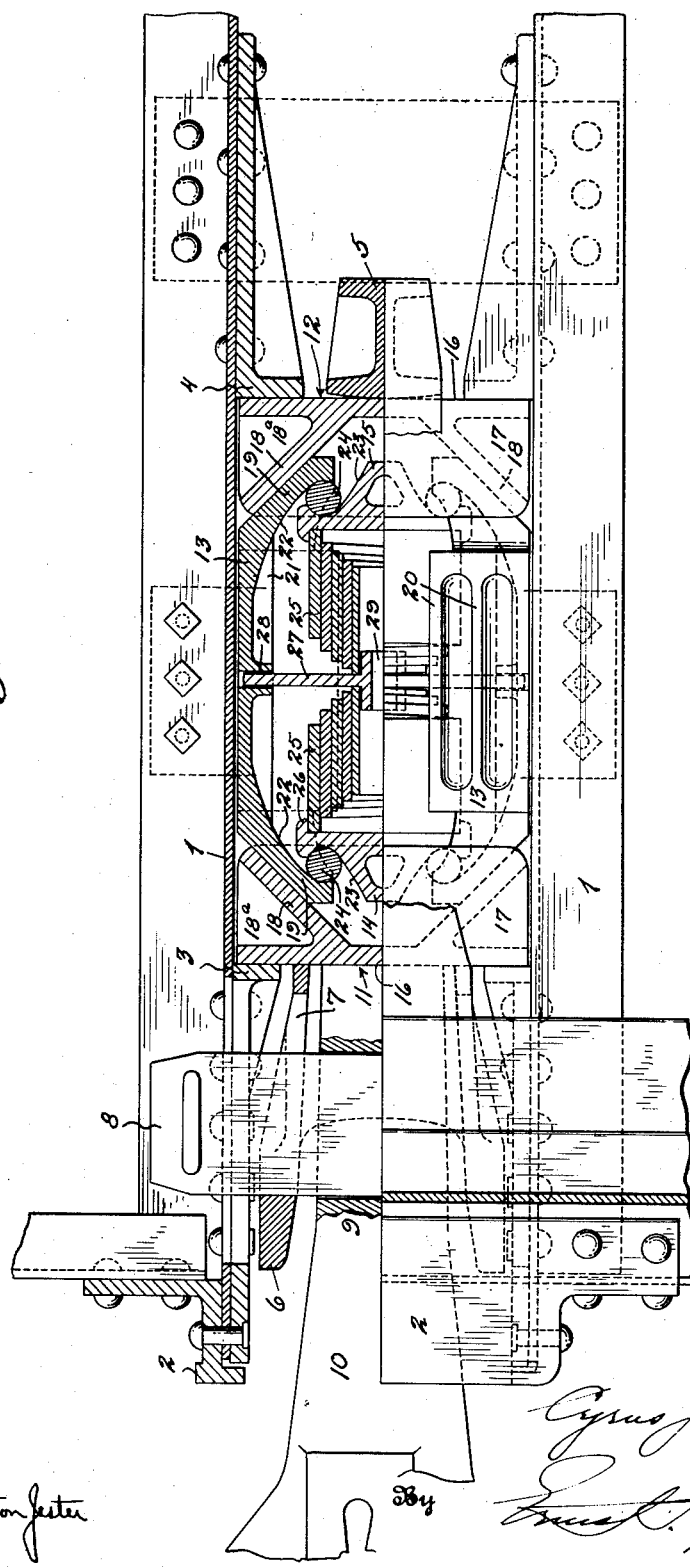

1,918,646

UNITED STATES PATENT OFFICE

CYRUS J. HOLLAND, OF CHICAGO, ILLINOIS

FRICTION DRAFT GEAR

Application filed September 30, 1927. Serial No. 223,185.

The invention relates to shock absorbing devices particularly adapted for though not necessarily restricted to use as part of the draft rigging of a railway car, and has special reference to a draft gear embodying cushioning means and friction producing means.

The principal object of the invention, generally stated, is to improve mechanisms of this character particularly of the type shown in Patent No. 927,810 issued to George C. Murray on July 13th, 1909. Said patent discloses a draft gear or shock absorbing mechanism of such construction that at the initiation of a blow or shock almost the entire force may be transmitted to the spring or other moving element, and as the force continues to act the component thereof acting to compress the spring or yielding resistance element may be decreased at any rate desired according to the conformation of the surfaces of certain coacting parts, while the remainder of said force will cause compression and friction between the elements of the mechanism and be thus absorbed. The patent also describes certain features whereby the ratio of compression of the yielding resistance element to the distance through which the applied force acts progressively increases during the action of the force, that is, the resistance is accelerated. The patent above referred to contains several modifications but in all instances use is made of a single helical spring as the cushioning means or yieldable resistance member. In the actual reduction of the Murray structure to commercial practice, use has been made of three helical springs concentrically arranged, this having been found necessary in order to obtain the proper capacity. As the tonnage of modern railroad equipment has increased it has been found necessary to increase the spring capacity of the gear correspondingly with the result that the friction shoes have been so shaped, to provide maximum spring accommodating space, that they are materially weakened. While gears of this type have given satisfactory service, the life is somewhat short as the end portions of the friction shoes or side wedges crack and break off on account of the weakness caused by excessively cutting away the material to accommodate springs of necessary capacity.

It is with the above objections to the Murray gear in mind that I have designed the present invention which consists primarily in employing volute springs in a gear of this type and of practically the same construction in other respects in order that the proper capacity will be insured without sacrificing strength of the parts as I have discovered that size for size volute springs have a much greater capacity than those of the helical type.

Another object of the invention is to provide a shock absorbing mechanism of this character in which any desired number, within certain limits, of volute springs may be employed, it being conceivable that the springs be arranged in any one of several different ways, for instance in series or in twin or parallel.

A further object of the invention is to provide a gear of this character in which, on account of the employment of volute springs, the coacting wedge or friction producing surfaces may be of such inclination as to have a smooth and efficient action while possessing the maximum strength so as to be capable of withstanding shocks and jars for a prolonged period of time, thus greatly lengthening the life of the entire gear.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a view partly in plan and partly in horizontal section showing a gear of the Murray type constructed or modified in accordance with my invention.

Figure 2 is a side elevation thereof, parts of the rigging being shown in dot and dash lines and parts of the car being shown in section, and Figure 3 is a cross sectional view.

Referring more particularly to the drawings the numeral 1 designates center sills of any ordinary or preferred type connected by the striking casting 2, and 3 and 4 designate the front and rear stops. The yoke is designated at 5 and includes arms 6 having slots 7 for the passage of a key 8 which also passes through a slot 9 in the coupler butt 10. There is nothing distinctive about these parts as they are all old and well known and form no part of the invention though they are illustrated for the sake of clearness. The space defined between the center sills and the front and rear stops constitutes the gear pocket which is of the usual standard size.

My gear structure is of course located within this pocket and includes front and rear followers 11 and 12 respectively between which are interposed laterally disposed shoes or side wedges 13, forward and rear cam blocks 14 and 15 and the yieldable resistance means or cushioning device to be described. The reference characters 11 to 15 inclusive refer only generally to the parts all of which will be described hereinafter in greater detail so as to render the entire construction readily comprehensible.

The front and rear followers 11 and 12 may be and preferably are of identical construction and oppositely arranged. Each is preferably rectangular in shape with a flat outer face 16 and top and bottom wall portions 17 between which are inclined friction members 18 arranged in laterally diverging relation and reinforced by horizontally disposed webs 18ª which merge into the flat or plate-like main body portion. The side wedges or shoes 13 are preferably identical in construction and are of general rectangular box-like form or trough shaped in cross section with their end portions 19 inclined and providing friction faces engaging and coacting with the inclined friction members 18 on the followers. At the top and bottom the members 13 are strengthened by exteriorly arranged longitudinally extending ribs 20 and the sides are reinforced by interiorly located longitudinal ribs 21. However, it is conceivable that some other specific bracing means might be provided if found advisable. At their end portions 19 the side wedges 13 are formed with curved cam surfaces 22 for a purpose to be described.

The cam blocks 14 and 15 may be of identical construction and have somewhat frusto-pyramidal outer ends with curved cam surfaces 23 engaged by rollers 24 which in turn engage against the cam surfaces 22 of the side wedges, the rollers constituting the drive connection between the side wedges and the cam blocks for moving the latter toward each other upon movement of the followers 11 and 12 toward each other under either buff or draft.

I have discovered that by using volute springs as the cushioning means it is easily possible to obtain the proper spring capacity without using springs of such excessive size as to necessitate cutting down the dimensions of the followers, cam blocks or side wedges. While it is conceivable that volute springs might be arranged in several different ways between the cam blocks 14 and 15, I have, for the sake of illustration, shown a pair of volute springs 25 oppositely arranged and having their outer ends engaging against the inner faces of the cam blocks, these blocks being represented as having peripheral flanges 26 extending outwardly of and closely telescoping the springs for centering the latter and consequently maintaining them against lateral displacement in service and preventing expansion thereof. A convenient abutment means for the inner ends of the springs, in case they are used as shown, may consist of a bar 27 extending transversely of the gear with its ends slidably mounted within openings 28 in the side wedges, the central portion of the bar having a hub portion 29 projecting beyond both sides thereof and engaging closely within the inner or adjacent ends of the springs for assisting in centering them and preventing contraction or inward coiling.

In the operation it is of course apparent that under normal conditions the followers 11 and 12 are in engagement with the stops 3 and 4 respectively. Upon movement of the followers 11 and 12 relatively to each other upon the occurrence of either draft or buff strains the inclined friction faces of members 18 coacting with the corresponding friction faces 19 at the ends of the side wedges or shoes will cause the side wedges to move toward each other. Owing to the coaction between the rollers 24 and the cam surfaces 22 and 23 it is apparent that the wedge blocks 14 and 15 will move relatively toward each other, the volute springs 25 being then compressed. As the openings 28 are provided in the side wedges or shoes for the accommodation of the ends of the abutment bar 27 there will be nothing to interfere with the lateral movement of the side wedges or shoes. Upon the cessation of a draft or buffing strain the springs 25 will operate to force the cam blocks 14 and 15 apart, thereby restoring the other parts of the gear to normal position. As a matter of fact the operation is almost identical with that of the gear shown in the above mentioned patent, the improvements in this particular case residing in the specific construction of the parts and the employment of the volute springs. It should be distinctly understood that there is no particular limitation as to the manner in which the springs are arranged especially as this would depend on the desired capacity and the size of the spring or springs. A distinct feature of advantage is that by using the volute springs the other parts of the gear may be of ample dimensions to possess the requisite strength whereas the ordinary gear of this type embodying helical springs is weak and liable to fracture at the ends of the wedge faces. Furthermore the parts of the gear as shown may have friction faces of a most efficient pitch or inclination as it is not necessary to reduce the size and thus sacrifice any necessary friction areas. Ample provision has been made in the way of webs and ribs for reinforcing the side wedges or shoes and also the front and rear followers so that all of these parts will be well capable of withstanding the severe impacts to which a gear of this type is subjected while in service. It is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a shock absorbing mechanism, spaced followers having diverging friction faces at their confronting sides, lateral wedge members having their end portions inclined and coacting with said friction faces, means located within the confines of said wedge members and operatively connected therewith for movement toward each other upon inward movement of the wedge members, volute spring means interposed between said means for compression thereby upon movement thereof, said spring means comprising a pair of volute springs arranged in end to end relation, and abutment means between the adjacent ends of the springs connected with the wedge members to be restrained from movement longitudinally thereof, said abutment means having portions thereon engaging within the spring.

2. In a shock absorbing mechanism, spaced followers having diverging friction faces at their confronting sides, lateral wedge members having their end portions inclined and coacting with said friction faces, means located within the confines of said wedge members and operatively connected therewith for movement toward each other upon inward movement of the wedge members, volute spring means interposed between said means for compression thereby upon movement thereof, said spring means comprising a pair of volute springs arranged in end to end relation, and abutment means between the adjacent ends of the springs, said wedge members having openings therein slidably receiving said abutment means.

3. In a shock absorbing mechanism, spaced followers having diverging friction faces at their confronting sides, lateral wedge members having their end portions inclined and coacting with said friction faces, means located within the confines of said wedge members and operatively connected therewith for movement toward each other upon inward movement of the wedge members, volute spring means interposed between said means for compression thereby upon movement thereof, said spring means comprising a pair of volute springs arranged in end to end relation, and abutment means between the adjacent ends of the springs engaging the wedge members.

4. In a shock absorbing mechanism, spaced followers, lateral wedge members movable inwardly upon movement of the followers toward each other, other members engaged by said wedge members and movable toward each other upon inward movement of said wedge members, a pair of volute springs arranged in end to end relation between said last named members, and abutment means between the adjacent ends of said volute springs, comprising a bar slidable within openings in the wedge members and provided centrally with guide means engaging the volute springs.

5. In a shock absorbing mechanism, spaced followers having diverging friction faces at their confronting sides, lateral wedge members having their end portions inclined and coacting with said friction faces, springs arranged in tandem relation between the followers, means located within the confines of said wedge members and operatively connected therewith for movement toward each other upon inward movement of said wedge members for applying compression longitudinally upon said springs, and abutment means between the springs positioned by the wedge members.

CYRUS J. HOLLAND.